I. S. & C. N. BROWN.
Planing-Saws.
No. 197,325. Patented Nov. 20, 1877.
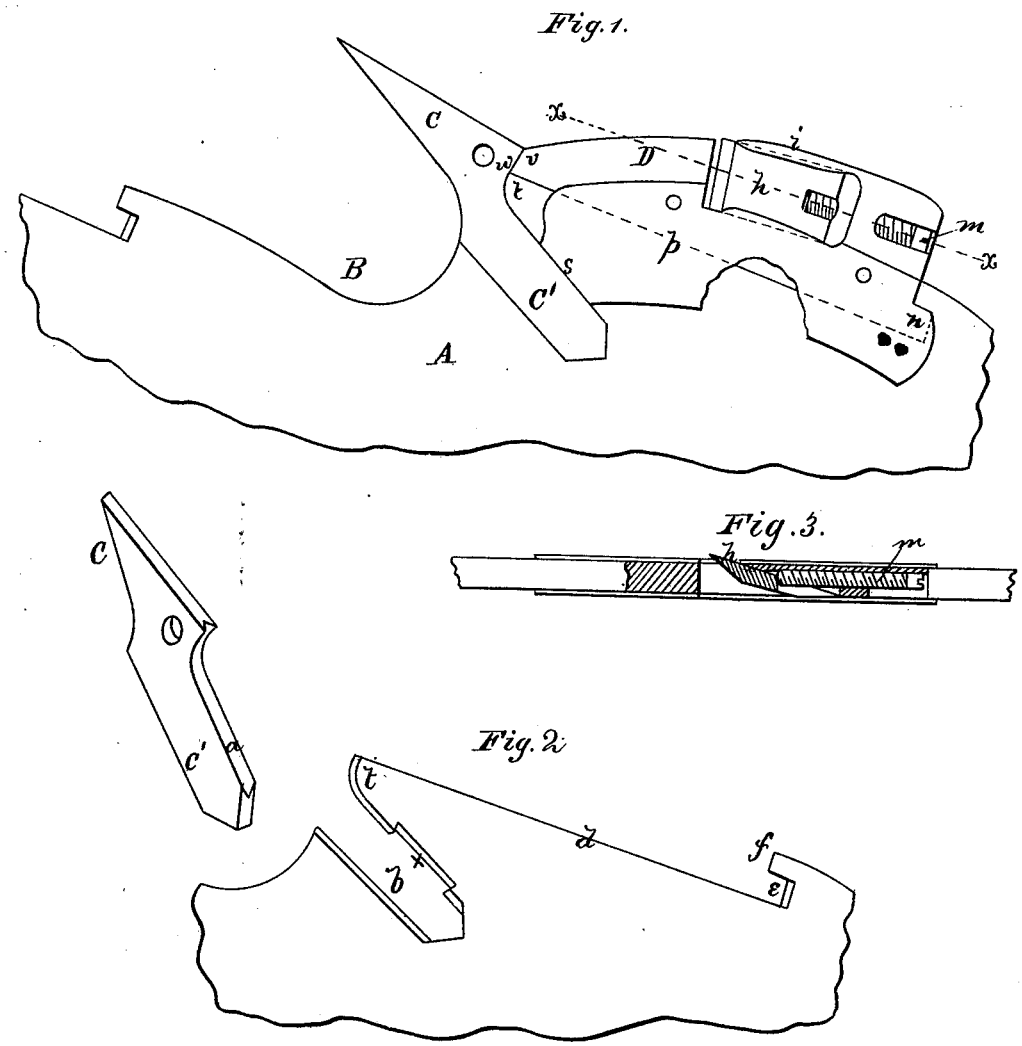

UNITED STATES PATENT OFFICE.

IRA S. BROWN AND CHARLES N. BROWN, OF PROVIDENCE, RHODE ISLAND.

IMPROVEMENT IN PLANING-SAWS.

Specification forming part of Letters Patent No. 197,325, dated November 20, 1877; application filed March 7, 1877.

*To all whom it may concern:*

Be it known that we, IRA S. BROWN and CHARLES N. BROWN, of Providence, in the county of Providence and State of Rhode Island, have invented certain new and useful Improvements in Planing-Saws; and we do hereby declare the following to be a full, clear, and exact description thereof, reference being had to the accompanying drawing, and to the letters of reference marked thereon.

Our invention relates to circular saws; and it consists in the construction and arrangement of a planer with the inserted tooth in the saw-blade, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a side view of a part of a circular saw, with one saw-tooth and plane in place thereon. Fig. 2 is a view of the saw plate and tooth, detached. Fig. 3 is a section through the plane.

A represents a part of a circular-saw plate, provided with the usual recesses B in front of the teeth. C represents the tooth formed with the shank C', which is straight, and has V-shaped grooves a on both edges, fitting over correspondingly-shaped edges of the slot b in the saw-plate. This tooth is inserted at such an angle with the radial line of the saw that the centrifugal force will cause no displacement of the tooth, no matter at what speed the saw may be run. Back of the slot b for the tooth the saw-plate is cut with an inclined edge, d, at the rear of which is a recess, e, and lip f.

D represents the plane-stock, having the cutter h placed in a dovetailed groove, i, thereon, and adjusted by a set-screw, m. At the rear end of the stock D is formed a heel, n, to fit in the recess e under the lip f, the stock lying upon the edge d of the saw-plate. On each side of the stock D is fastened a thin metal plate, p, which project downward, and lie close to and against the sides of the saw-plates. Near the front these plates p p are united, forming a sleeve or socket, s, through which the nose t of the saw-plate is passed, and the bottom of the socket is fitted in a recess, x, formed in the slot b, as shown in Fig. 2. When the stock is thus placed in position its front end or toe v is flush with the nose t of the saw-plate; and the tooth C being then inserted, a shoulder, w, thereon overlaps both of said parts, thereby holding the plane-stock in its place.

In a circular saw we propose to use this plane-stock, with its adjustable cutter, to the rear of two or more teeth, whereby we secure the use of the chisel-teeth without set, spread, or bevel, and may be of even less thickness than the saw-plate, making two perfectly planed surfaces in a three thirty-seconds of an inch kerf, and thereby saving much time and power.

Having thus fully described our invention, what we claim as new, and desire to secure by Letters Patent, is—

1. The plane-stock D, carrying the adjustable cutter h, and provided with the side plates p p, in combination with the saw-tooth C, having shoulder w, for overlapping the toe of the plane-stock and locking the same in position, substantially as herein set forth.

2. The side plates p p, forming the sleeve or socket s below the plane-stock D, in combination with the saw-plate A, formed with the nose s, and the recess x in the slot b, substantially as and for the purposes herein set forth.

In testimony that we claim the foregoing we have hereunto set our hands.

IRA S. BROWN.
CHARLES N. BROWN.

Witnesses:
ALFRED RICKARD,
WM. W. RICKARD.